United States Patent [19]
Yoshino et al.

[11] 3,812,488
[45] May 21, 1974

[54] TELEVISION RECEIVER FOR DISPLAYING A COMPUTING PROCESS

[75] Inventors: Hirokazu Yoshino, Katano; Tetsuo Yamaguchi, Hirakata; Eiichi Tsuboka, Nara, all of Japan

[73] Assignee: Matsushita Electric Industrial Co. Ltd., Kadoma-shi, Osaka, Japan

[22] Filed: July 28, 1972

[21] Appl. No.: 275,895

[30] Foreign Application Priority Data

| | | |
|---|---|---|
| July 31, 9171 | Japan | 46-57713 |
| July 31, 1971 | Japan | 46-57714 |
| Nov. 9, 1971 | Japan | 46-89570 |
| Nov. 10, 1971 | Japan | 46-89571 |

[52] U.S. Cl. .......... 340/324 AD, 340/172.5
[51] Int. Cl. .......... G06f 3/14
[58] Field of Search .......... 340/324 AD, 172.5

[56] References Cited

UNITED STATES PATENTS

| | | | |
|---|---|---|---|
| 2,847,661 | 8/1958 | Althouse | 340/324 AD |
| 3,500,335 | 3/1970 | Cuccio | 340/324 AD |

*Primary Examiner*—John W. Caldwell
*Assistant Examiner*—Marshall M. Curtis
*Attorney, Agent, or Firm*—Stevens, Davis, Miller & Mosher

[57] ABSTRACT

A television receiver comprising a computing means for processing input data, a converting means in which the computing process and the computed result are written and from which the written content is read out in timing with the display system, i.e. television system, and a display means for displaying the read information on the picture tube of the television receiver.

7 Claims, 11 Drawing Figures

TELEVISION RECEIVER FOR DISPLAYING A COMPUTING PROCESS

The present invention relates to a television receiver which can display on its picture tube a computing process in a plurality of rows that is carried out in a computing section, i.e. electronic table calculator (hereinafter referred to as ETC for brevity) associated with the television receiver.

The electronic table calculator or ETC now on the market can display the computed result only in a single row by utilizing fluorescent display tubes, luminous diodes or luminous liquid crystal cells. In such an ETC, therefore, it is difficult to display the computing process.

Accordingly, it is an object of the present invention to display the computing process by employing what is called multiple-row-display.

Another object of the present invention is to provide a simple data converting means for displaying the computing process on the picture tube without unifying the timing system of the ETC with that of the display system.

A yet further object of the present invention is to provide a means for inserting a line between the numerals to be processed and the computed result in the display in order to make the computing process more comprehensive.

An additional object of the present invention is to provide a means for making in the number a space on the left of every third numeral appearing to the left of the decimal point in order to facilitate reading the result in the same manner as in a number with commas applied every three digits.

A further object of the present invention is to provide a color control means for displaying the numbers from the memory in different color from the other numbers in the calculation so as to make the display distinct.

A still further object of the present invention is to provide a television receiver having a function of simultaneously displaying on the picture tube the television program and the computing process.

A yet another object of the present invention is to provide a television receiver having a computing function, in which the memory value is displayed in the uppermost row, the operand such as an addend, minuend, multiplicand or dividend in the second row, the operator of calculating sign and the operand such as an augend, subtrahend, multiplier or divisor in the third row, and the computed result in the fourth row.

For a better understanding the present invention, reference may be had to the accompanying drawings, in which.

Figure 3:
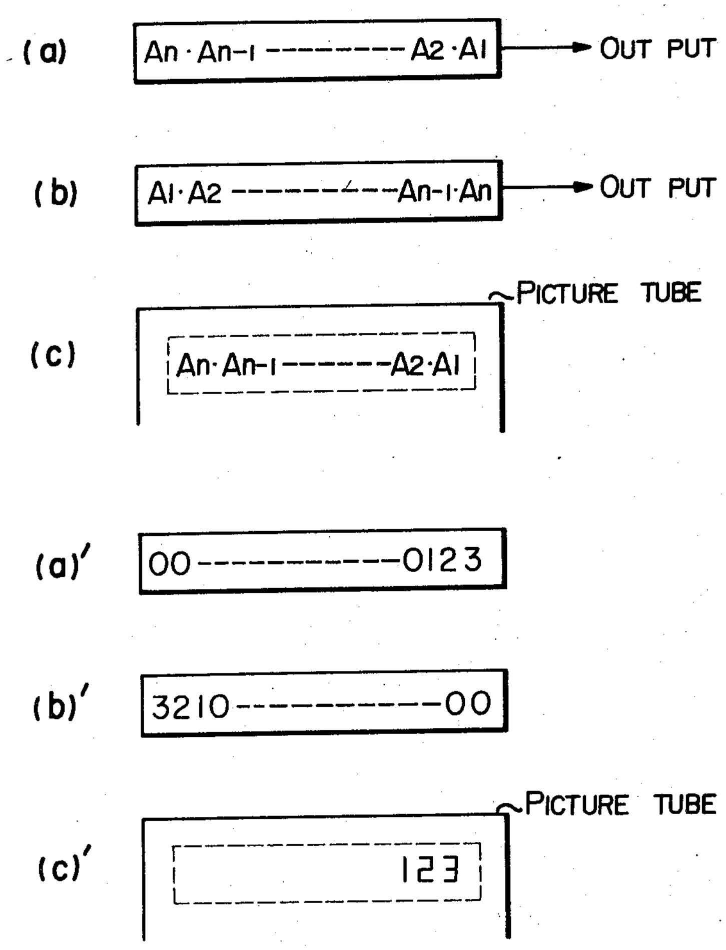
Figure 4:
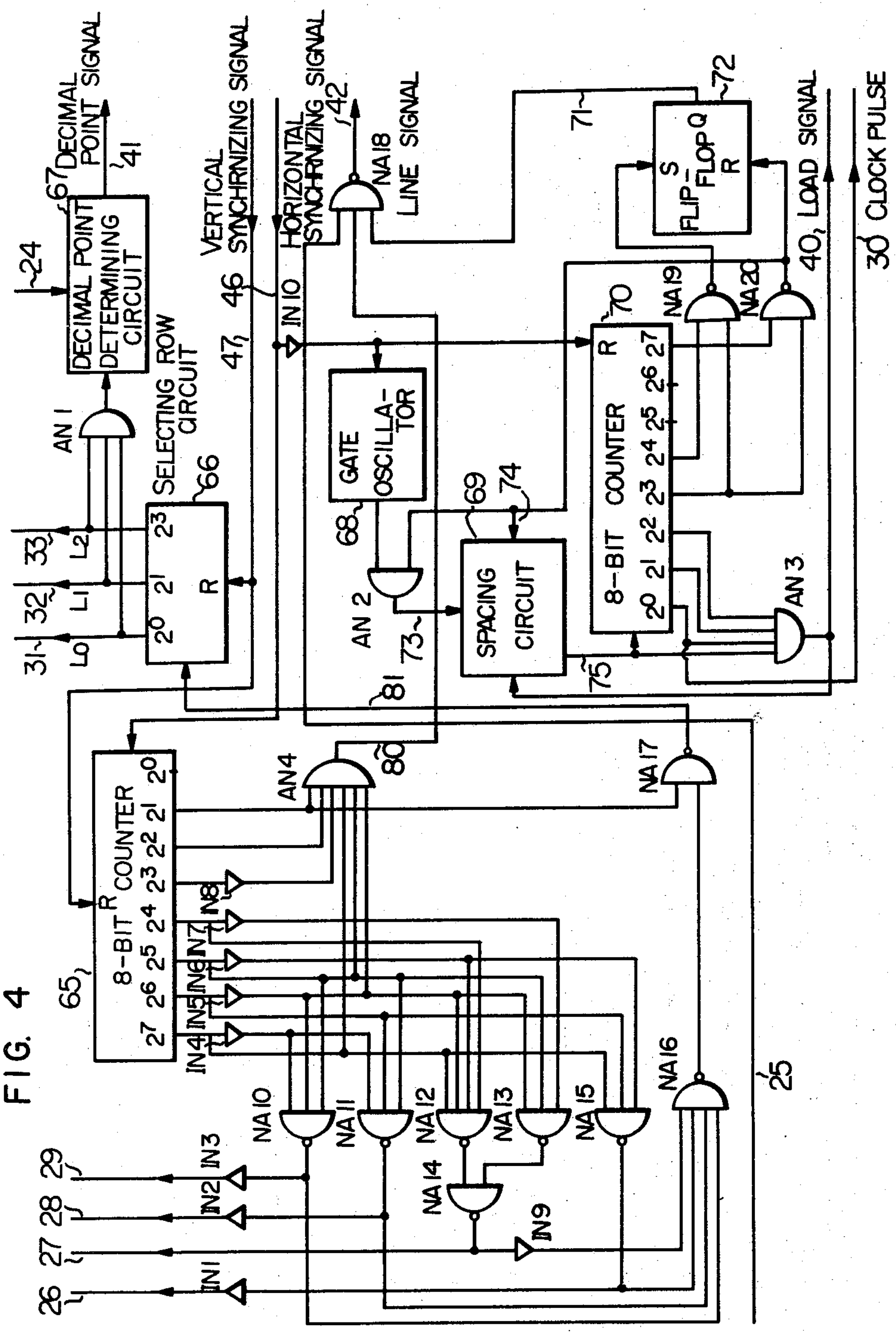
Figure 5:
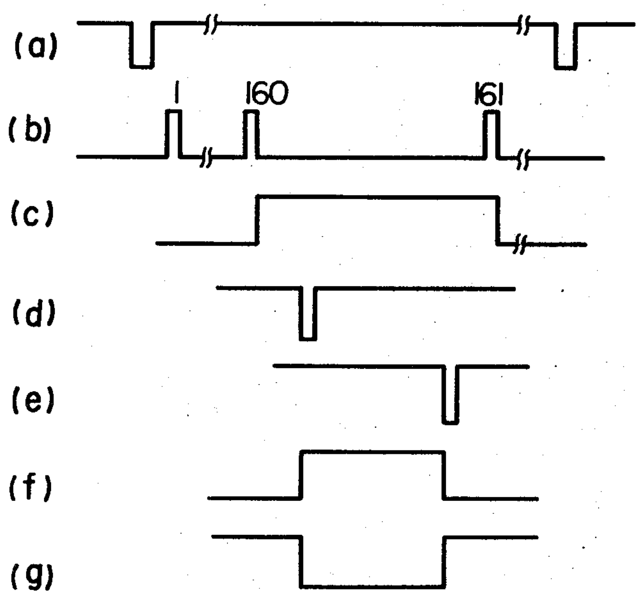
Figures 6, 7:
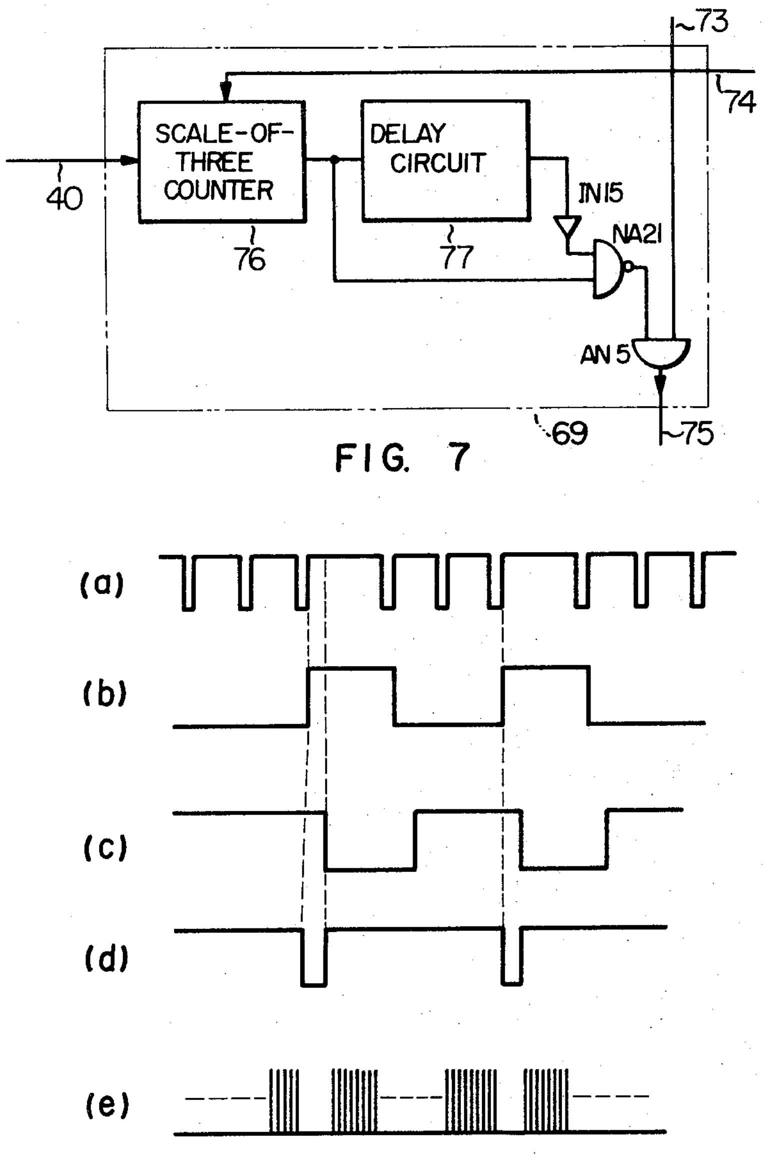
Figure 8:
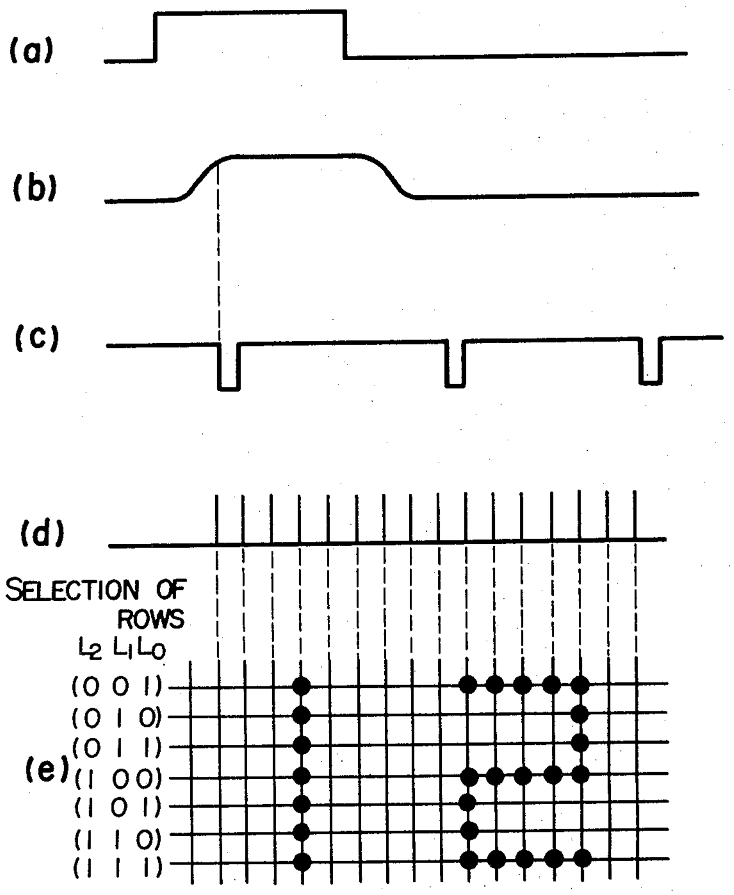
Figure 9:
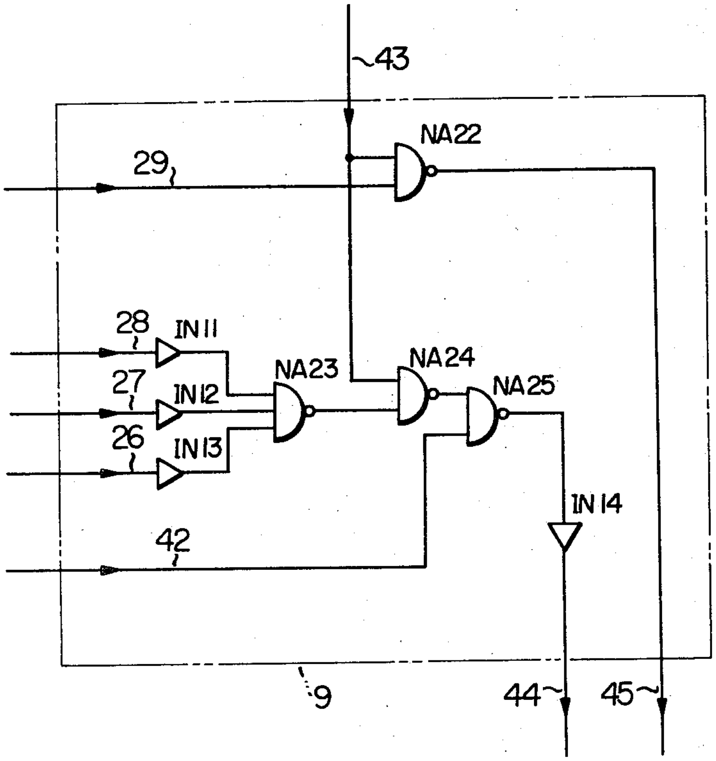
Figure 10:
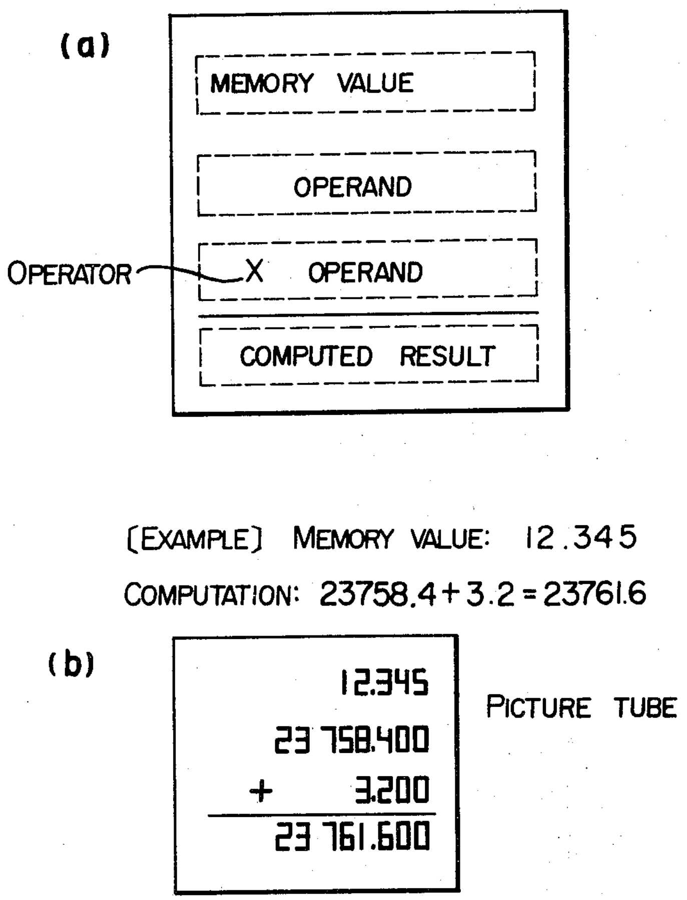
Figure 11:
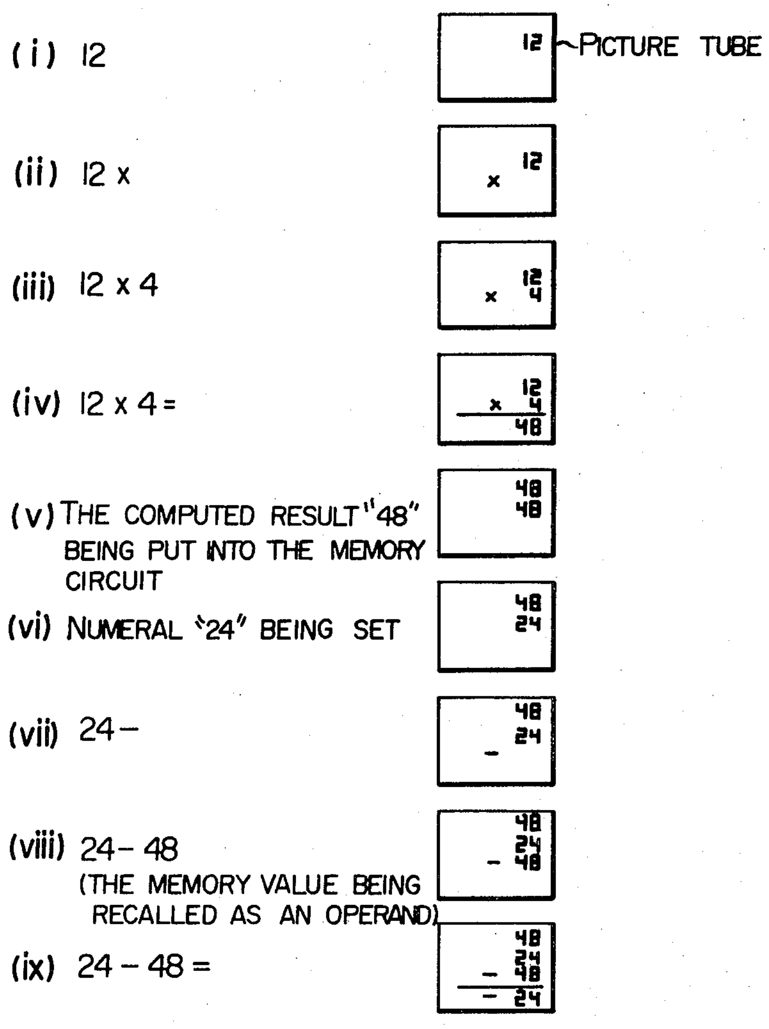

FIG. 3 comparatively shows the content of an operational register and that displayed on the picture tube;

FIG. 4 is a block diagram of a display control circuit;

FIG. 5 is a timing chart of a line display circuit;

FIG. 6 is a block diagram of a positional circuit;

FIG. 7 is a timing chart for the positional circuit shown in FIG. 6;

FIG. 8 shows timing charts of a character generating circuit and a parallel-series register and the pattern of a numeral;

FIG. 9 is a block diagram of a color control circuit;

FIG. 10 shows how numerals necessary for one computation are displayed on the picture tube; and FIG. 11 shows step by step the variations of display according to the progress of the computation.

Figure 1:
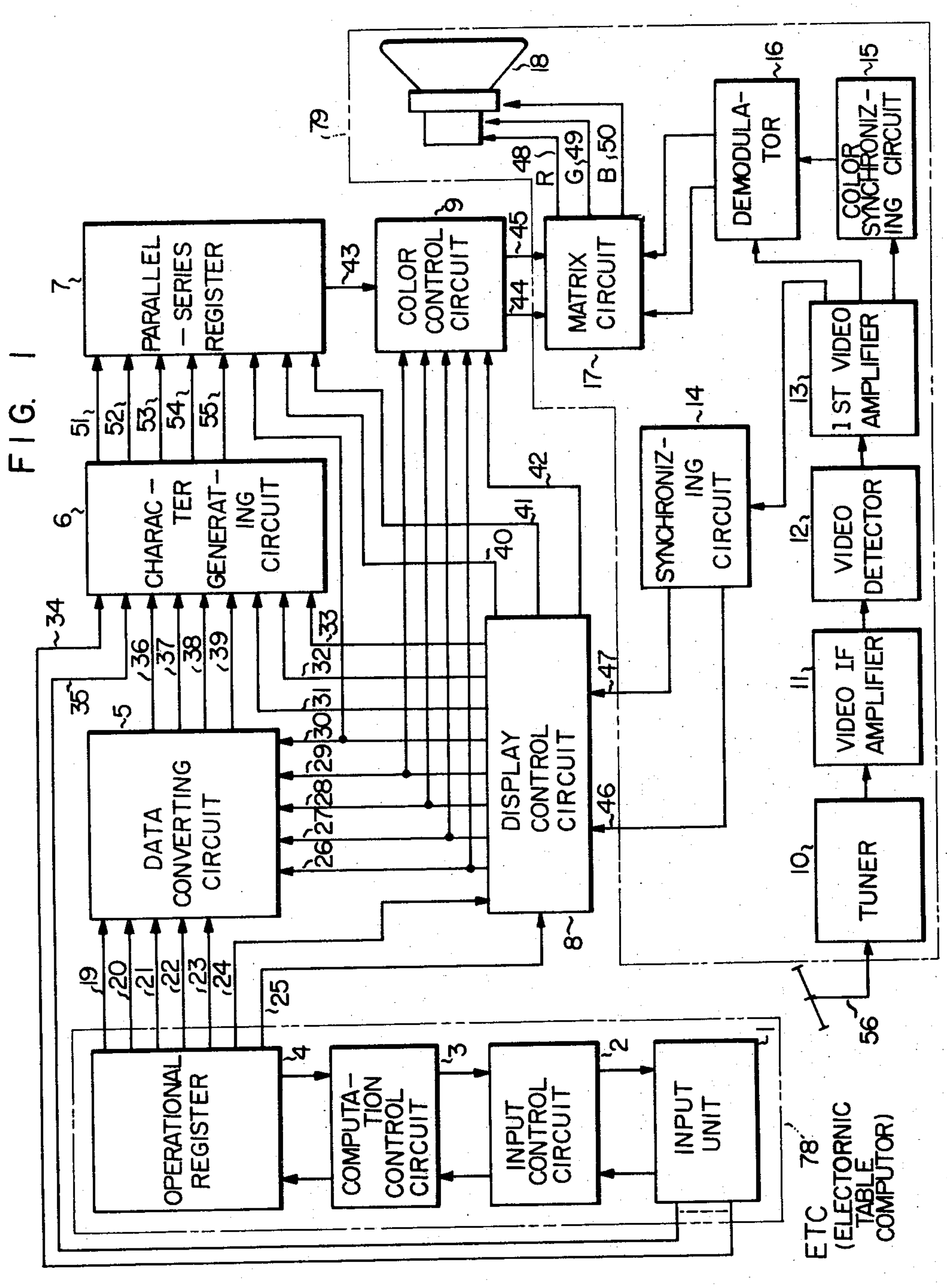
FIG. 1 is a block diagram of a television receiver having a computation function according to the present invention.

In FIG. 1, constituents enclosed by dash lines 78 constitute an ETC, which comprises an input unit or key board 1, an input control circuit 2, a computation control circuit 3, and an operational register 4. A data converting circuit 5 writes thereinto the content of the operational register 4 in timing with the ETC and reads out data onto the picture tube in response to the synchronizing signal of the television receiver. A character generating circuit 6 converts the outputs 36, 37, 38 and 39 of the data converting circuit 5 into an address signal, signals 31, 32 and 33 into a signal for selecting a row where a certain character is to be displayed, and the signal 34 and 35 from the input unit 1 of the ETC 78 into address signals for operators. A parallel-series register 7 receives the parallel data 51, 52, 53, 54 and 55 from the character generating circuit 6, a decimal point data 41, a clock signal 30 and a load signal 40, and delivers an output signal 43. A display control circuit 8 supplies for the data converting circuit 5 and a color control circuit 9 positioning signals 26, 27, 28 and 29 for properly positioning the data on the picture tube in response to horizontal and vertical synchronizing signals 46 and 47. Signals 31, 32 and 33 for selecting a row in which each character or numeral are displayed is fed to the character generating circuit 6 and a line signal 42 is applied to the color control circuit 9. A dash line enclosure 79 indicates a part of an ordinary television receiver, which comprises an antenna 56, a tuner 10, a video IF amplifier 11, a video detector 12, a first video amplifier 13, a synchronizing circuit 14 for supplying the horizontal and vertical synchronizing signals 46 and 47 for the display control circuit 8, a color synchronizing circuit 15, a demodulator 16, a matrix circuit 17, and a picture tube 18 to which red, blue and green chrominance signals 48, 49 and 50 from the matrix circuit 17 are fed. These chrominance signals together with the outputs 44 and 45 of the color control circuit 9 can produce a color display on the picture tube 18.

The operation of the circuit shown in FIG. 1 will next be described. A numeral signal from the input unit 1 of the ETC 78 is processed by the input control circuit 2 and the computation control circuit 3, stored in the operational register 4, fed as a signal 19 to the data converting circuit 5, sequentially memorized from the uppermost digit down in the register (described later in detail) included in the circuit 5, read out from the register upon the completion of the memorization in response to the clock signal 30, further fed through the character generating circuit 6, the parallel-series register 7, the color control circuit 9 and the matrix circuit 17, and finally displayed on the picture tube 18. On the other hand, the operator is displayed by directly applying the signals 34 and 35 from the input unit 1 to the character generating circuit 6. Another numeral positioning signal written in the register 7 is also displayed on the picture tube 18 in the same manner as described above, all the computation processes so far being displayed with the operand and the operator and operand appearing respectively in the second and third rows. Then, if the equality button of the input unit 1 is depressed, the computed result is written in the register 7 and at the same time the line signal 25 is supplied for the display control circuit 8 so that the signal 42 is applied to the color control circuit 9. Therefore, the operand, operator, line, and computed result are displayed on the picture tube 18. When a series of computations are continuously performed, this process of display will be repeated.

Figure 2:
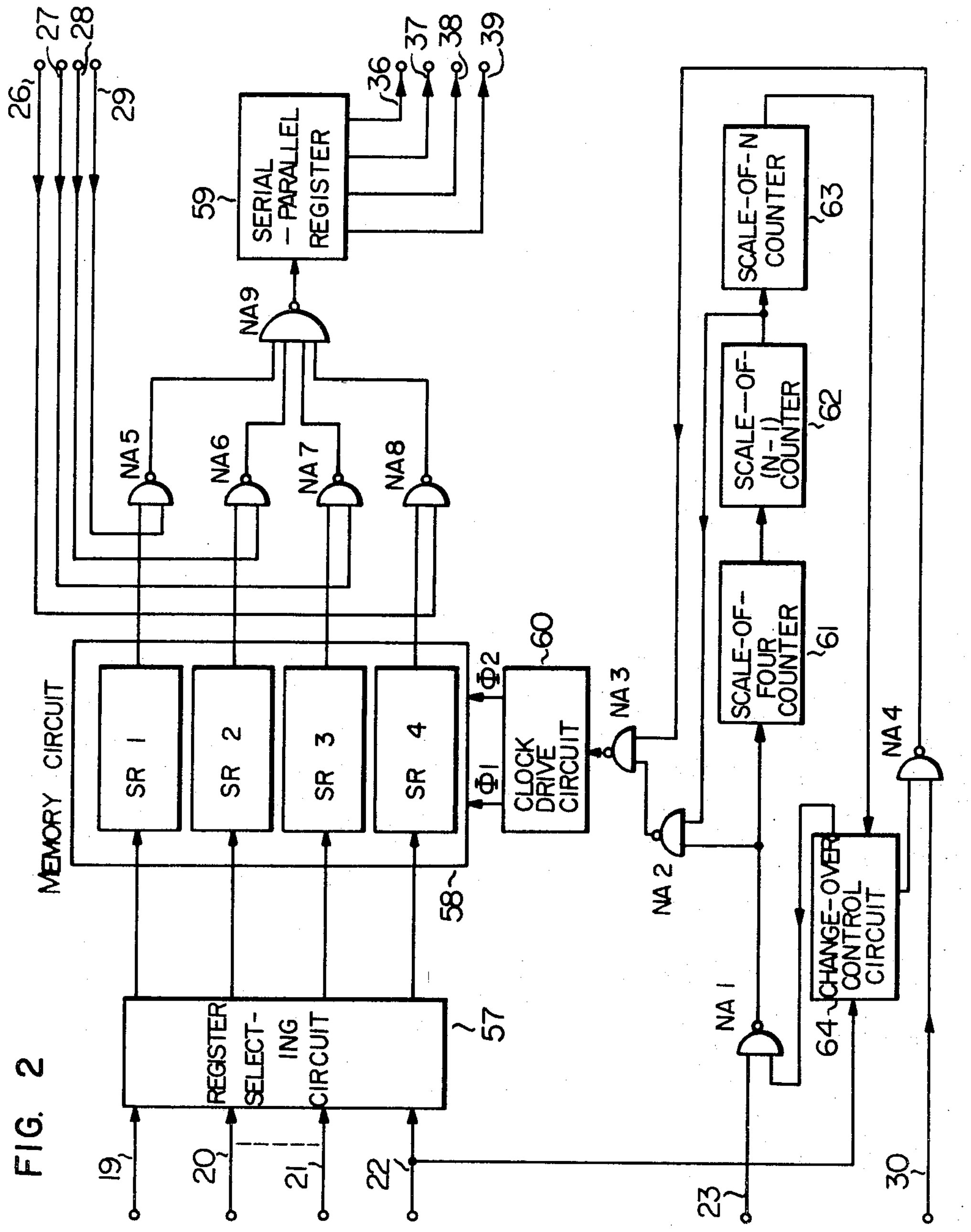
FIG. 2 is a block diagram of a data converting circuit.

FIG. 2 shows in detail the constitution of the data converting circuit 5. This data converting circuit 5 receives the information from the ETC 78 which is derived serially from the lowermost digit upward, and writes the information into the memory circuit from the uppermost digit down, so that the desired information is properly displayed on the picture tube 18. In FIG. 2, there is shown a register selecting circuit 57, a memory circuit 58 consisting of registers SR1, SR2, SR3, and SR4 each adapted for $4 \times n$ bits (in the case where every row consists of $n$-digits), a register 59 for series-parallel converting a part of the data corresponding to one digit (4 bits), a scale-of-n counter 63, a change-over control circuit 64 for switching over the writing and reading of the memory circuit 58, a clock drive circuit 60, NAND circuits NA1 . . . NA9, a scale-of-four counter 61, and a scale-of-($n$—1) counter 62. The information 19 from the ETC 78 is controlled by control signals 20 and 21 and a busy signal 22, and written into the registers of the memory circuit 58 in the computing order. The clock signal to the memory circuit 58 is the NAND taken at the circuit NA1 of the output of the change-over control circuit 64 and the clock pulse signal 23 from the ETC 78, and the clock pulse signal 23 is also applied to the scale-of-four counter 61 connected with the scale-of-($n$—1) counter 62. Therefore, the gate of the NAND circuit NA1 if opened every time $4(n-1)$ clock pulses of the signal 23 have been counted, so that four clock pulses are applied to the clock drive circuit 60. Accordingly, clock signals $\phi_1$ and $\phi_2$ are produced and a piece of information corresponding to a single digit in the operational register 4 of the ETC 78 is serially written in the registers SR1 to SR4 of the memory circuit 58. Thus, since the data is written into the registers digit by digit at a period of ($n$ — 1) digits, the data is to be stored from the uppermost digit down. The NAND gate NA4 is opened by the output of the changeover control circuit when the scale-of-n counter has counted n clock pulses, and the NAND gate NA1 is closed. If the NAND gate NA4 is opened, the clock signals $\phi_1$ and $\phi_2$ of the memory circuit 58 are synchronized with a clock pulse signal 30 for television picture display. FIG. 3 shows how the content of the operational register 4 of the ETC 78 is displayed on the picture tube of a television receiver. In this figure, (a) designates the content of the operational register 4 of the ETC 78, (b) the content of the register SR1 of the memory circuit 58, and (c) information displayed on the picture tube, where characters $A_1 \ldots A_n$ represent respective numerals beginning from the lowermost digit and ending at the uppermost digit. For example, as shown in the lower part of FIG. 3, when a number 123 is set in the ETC 78 the content of the operational register 4 of the ETC 78 is "00 . . . 0123" as shown in (a)', the content of the register SR1 of the memory circuit 58 is accordingly "3210 . . . 00" as shown in (b)', and the image displayed on the picture tube is therefore "123" as shown in (c)'.

FIG. 4 shows an example of the display control circuit 8 in FIG. 1 in detail. In this figure, an 8-bit counter 65 counts the horizontal sync signal 46 and can determine the horizontal position of the display on the picture tube by processing its respective outputs with appropriate logic circuits. Signals 26, 27, 28, and 29 determine the intervals of display in this four-row representation, a signal 80 determines the position of the line displayed on the picture tube, and a signal 81 serves as a clock signal to a row selecting circuit 66 which determines the rows in which certain characters are arranged on the picture tube. A decimal point determining circuit 67 determines the position of the decimal point in the ETC 78 by the signal 24 and supplies a decimal point signal 41 for the shift register 7. A gated oscillator 68 is an oscillator which is gated only during the duration of the horizontal sync signal and the clock pulse from this oscillator determines the horizontal position of the display. A spacing circuit 69 provides a space after every three digits to the left of the dicimal point of the displayed numbers. The detail of the spacing circuit 69 will be described later. An 8-bit counter 70 counts clock pulses 75 obtained by dividing one horizontal sweep period (1 H) by eight bits of a digit. A load signal 40 is delivered every time eight bits of the clock pulses 75 are counted and serves to write the data serially into the shift register 7 digit by digit. A flip-flop 72 determines the range of display of the line. NA10 to NA20 designate NAND circuits, AN1 to AN4 AND circuits, and IN1 to IN10 inverters.

FIG. 5 shows the timing of the various signals appearing in the line display circuit, in which (a) represents the vertical sync signal 47 of the television system, (b) the horizontal sync signal 46, (c) the output of the AND circuit AN4, (d) the output of the NAND circuit NA19, (e) the output of the NAND circuit NA20, (f) the output 71 of the flip-flop 72, and (g) the output 42 of the NAND circuit NA18.

FIG. 6 shows the detailed constitution of the spacing circuit 69, in which are shown a scale-of-three counter 76, a delay circuit 77, a NAND circuit NA21, an AND circuit AN5, an inverter IN15, a clock signal 73 supplied for the 8-bit counter 70, a clear signal 74, a load signal 40 representing each bit, and a signal 75 obtained by gating the clock signal 73 at every three digits. The operation of the spacing circuit 69 is as follows. The scale-of-three counter 76 delivers an output signal to the delay circuit 77 every time it counts three pulses of the signal 40, the NAND circuit NA21 generates a pulse whose duration is equal to the delay time characteristic of the delay circuit 77, and the AND circuit AN5 gates the clock signal during the delay time. The timing relation between those signals mentioned above are shown in FIG. 7, in which (a) represents the load signal 40, (b) the output of the scale-of-three counter 76, (c) the output of the inverter IN15, (d) the output of the AND circuit AN5, and (e) a clock signal gated in response to the output (d).

FIG. 8 shows the timing chart of the input signals to the character generating circuit 6 and the parallel-series converting register 7, in which (a) designates one of the outputs 36, 37, 38 and 39 carrying numeral information of the data converting circuit 5, (b) the output waveform giving the pattern of a numeral delivered from the character generating circuit 6 in response to the output signals 36, 37, 38 and 39, (c) the load signal 40, (d) the clock signal 30, and (e) a numeral pattern (5 × 7). For example, in this case, if a row is determined as "001" and the input data to the character generating circuit 6 is "1," the outputs 51, 52, 53, 54 and 55 will be 0, 0, 0, 1, 0, respectively. The position of clock signals 30 relating to signals representing the numeral pattern are indicated by the dash lines between (d) and (e).

FIG. 9 shows the circuit of an example of the color control circuit 9 in FIG. 1, in which NA22 to NA25 are NAND circuits and IN11 to IN14 are inverters. A signal 43 that is a dot signal representing a numeral pattern is fed to both the NAND circuits NA22 and NA24, and if the input data 43 is identical with the memory value, the NAND circuit NA22 is opened by the signal 29. If the output 45 of the NAND circuit NA22 is applied to, for example, the red output circuit of the matrix circuit 17, the memory value displayed in the uppermost row on the picture tube luminesces in red. If, on the other hand, the signal 43 is different from the memory value, the signal 43 is passed through the NAND circuit NA24 and fed to the NAND circuit NA25, which takes the logic sum of the signal 43 and the line signal 42. If the output 44 is applied to, for example, the green output circuit of the matrix circuit 17, the numerals indicating the process of computation luminesce in green.

In FIG. 10, diagram (a) shows the positions of the information displayed on the picture tube, in which the memory value is located in the uppermost or first row, the operand in the second row, the operator and operand in the third row, and the computed result in the fourth row.

The diagram (b) shows an Example of actual computation on the picture tube of a television receiver.

FIG. 11 shows as an example the steps of the whole process of an actual computation on the picture tube of a television receiver, in which (i) designates the step of displaying the operand "12," (ii) the step of adding the operator "X," (iii) the step of adding the operand "4," (iv) the step of pushing the equal button, (v) the step of storing the computed result "48" in the memory circuit, and (vi), (vii), (viii) and (ix) the steps of performing the computation "24 − 48 =." When the number as the computed result or the memory value takes a negative value, it is preceded by an algebraical sign "−."

As described above, according to the present invention, there are obtained various advantages such as the possibility of checking a computing process during the computation, the moment-to-moment display of the content of the memory register, the clarification of the computing process and the computed result by the use of multi-color representation, the display of a line or lines in the computing process, the provision of spaces between every third and fourth digits, and the display of the computed information on the picture tube of a television receiver in superposition with the television program.

What we claim is:

1. A television receiver comprising:

a computing means for performing a computing operation on input data provided by an input means such as a keyboard;

a register having 4 × *n* bits as a memory means, where *n* is the number of digits, for storing the data in operation from the uppermost digit;

a means for generating four clock pulses every time it counts 4 × (*n*−1) clock signals synchronized with a clock pulse of the computing means;

a means for writing the data obtained from the computing means starting from the lowermost digit thereof into said register with a means for generating drive pulses in response to said clock pulses;

a means for reading out the contents of said register from the uppermost digit by applying drive pulses which are generated by means of synchronizing signals included in the television broadcasting signals, after writing the data in said computing means into said register;

a means for generating a character signal by converting the signal read out of said register into the character signal;

a means for receiving a television broadcasting signal and demodulating the picture signal; and a picture tube for displaying thereon an image in response to the application of said character signal or both of the character and the picture signals.

2. A television receiver according to claim 1, wherein there is provided a means for counting pulses of the horizontal sync signal involved in the television signal and wherein the numerals representing the process of computation are arranged on said picture tube with an appropriate space left therebetween by reading out of said memory means the stored information when the counted value reaches a predetermined one.

3. A television receiver according to claim 1, further comprising at least three registers each having 4 × *n* bits to constitute said memory means, the computing information being selectively applied respectively to said registers to store therein the operands and the computed result, and the computing process being displayed on said picture tube by reading the contents of said registers.

4. A television receiver according to claim 3, wherein there is provided a means for counting the pulses of the horizontal sync signal involved in a television signal and a means for generating a line signal when the counted value reaches a predetermined one, so that a line is displayed between said operands and said computed result on said picture tube.

5. A television receiver according to claim 1, wherein there is provided a means for counting each number by three digits from the lowermost digit upward when the number is read out of said memory means and a means for gating a driving pulse applied to said memory means for the purpose of reading in response to the output of said counting means, so that spaces are provided between every third and fourth digits of each number displayed on said picture tube.

6. A television receiver according to claim 1, wherein said picture tube is a color picture tube and a means is further provided for displaying the computing process in some colors and in a plurality of rows on said color picture tube.

7. A television receiver according to claim 3, wherein four registers for storing therein the memory value, the operand, the operator and operand, and the computed result and the stored information being then read out to be displayed in four rows in the order mentioned on said picture tube.

* * * * *